Aug. 18, 1942.   H. H. RUDD   2,293,310
METAL-ENCLOSED BUS STRUCTURE
Filed Nov. 22, 1940   4 Sheets-Sheet 1
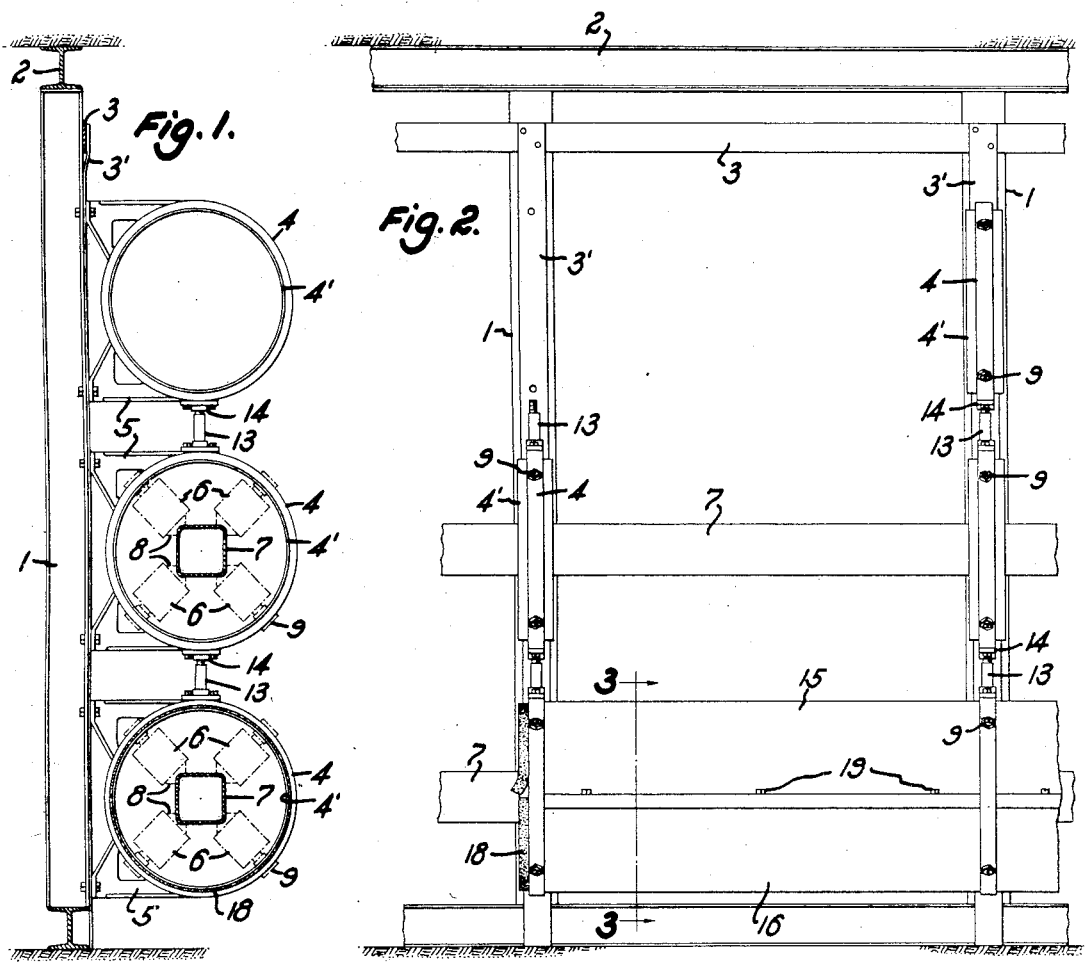
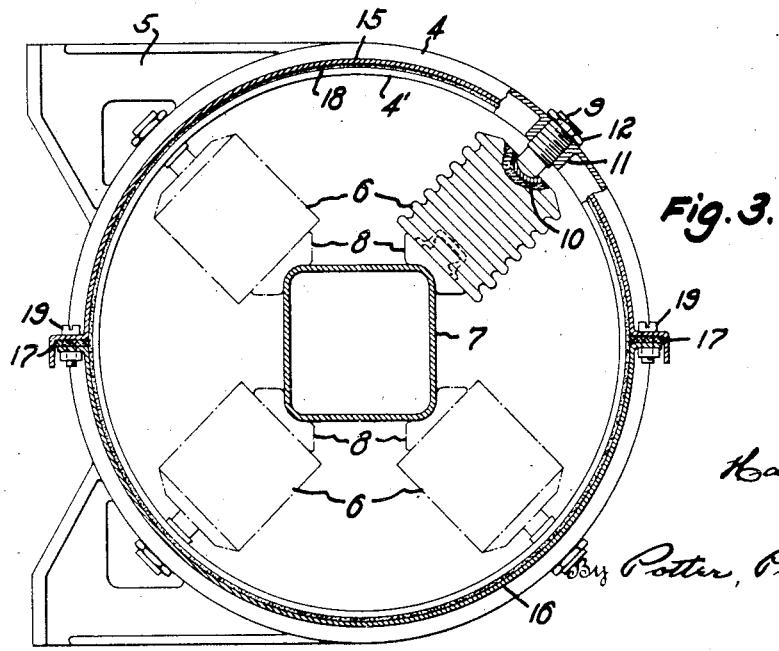
Inventor:
Harold H. Rudd,
By Potter, Pierce & Scheffler,
Attorneys.

Aug. 18, 1942.　　　　　H. H. RUDD　　　　2,293,310
METAL-ENCLOSED BUS STRUCTURE
Filed Nov. 22, 1940　　　　4 Sheets-Sheet 2
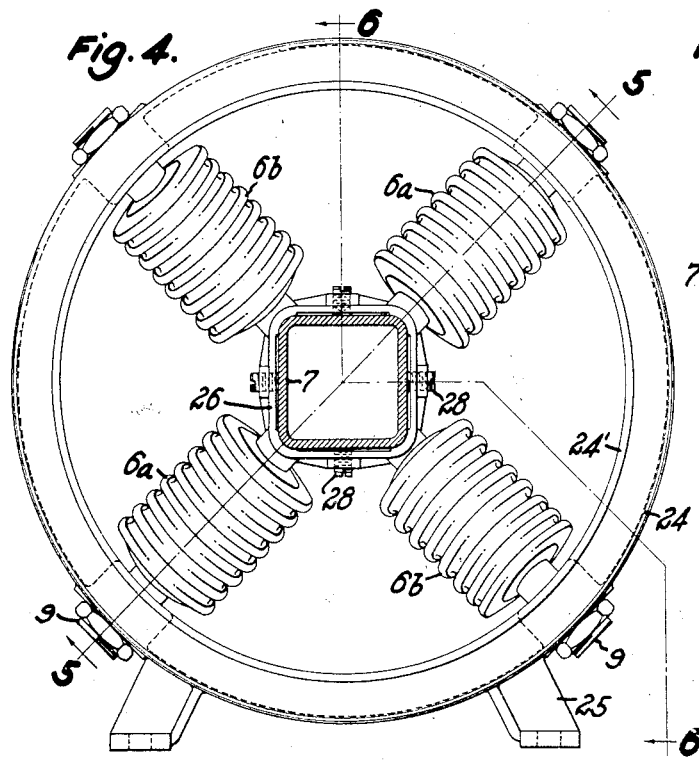
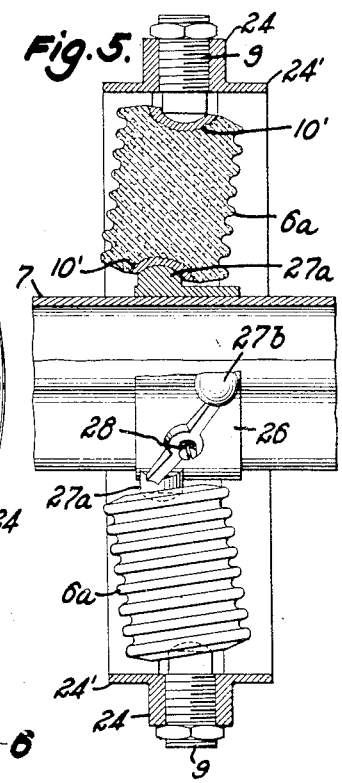
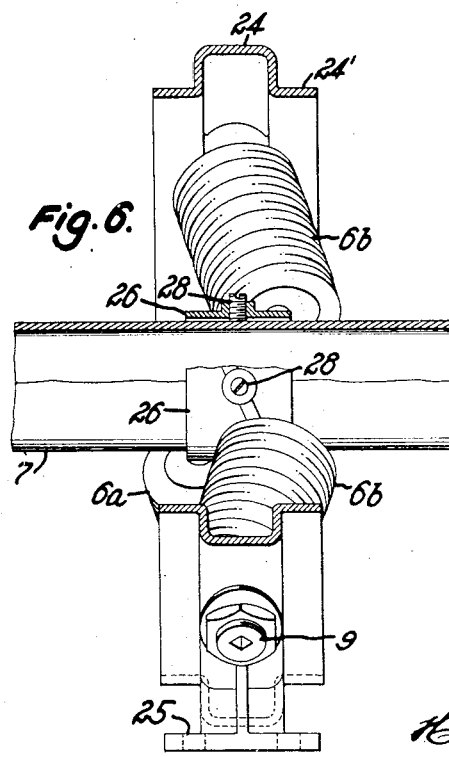
Inventor:
Harold H. Rudd,
By Potter, Pierce & Scheffler,
Attorneys.

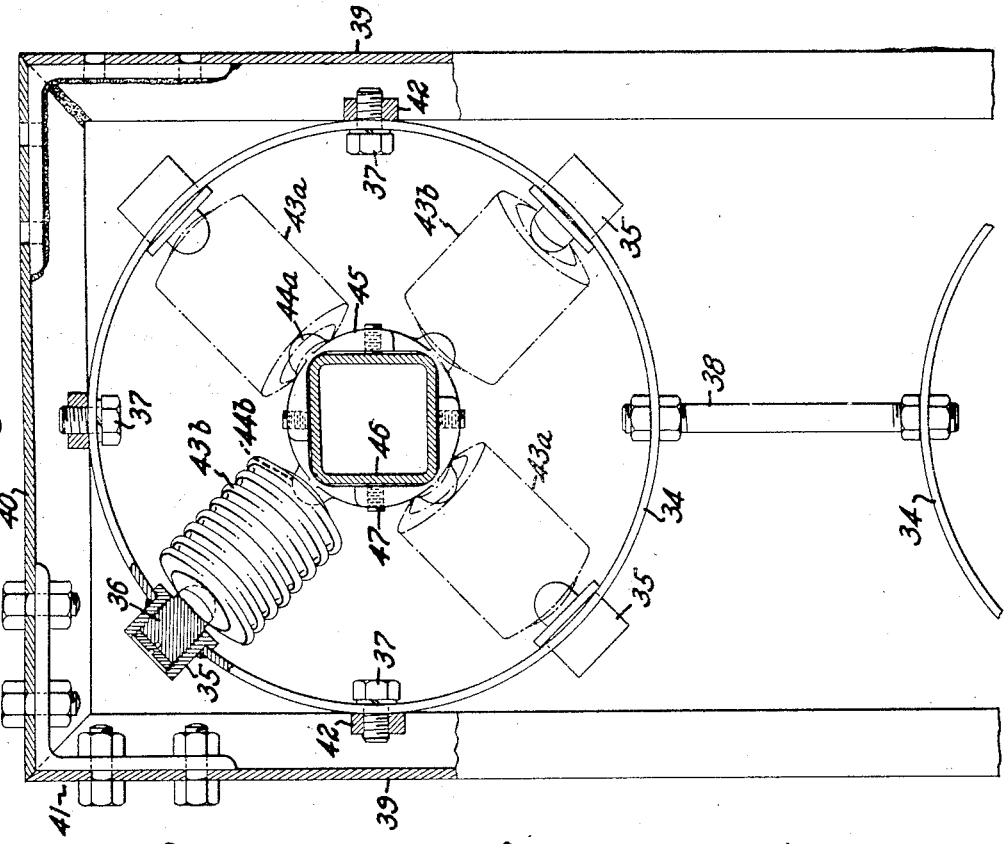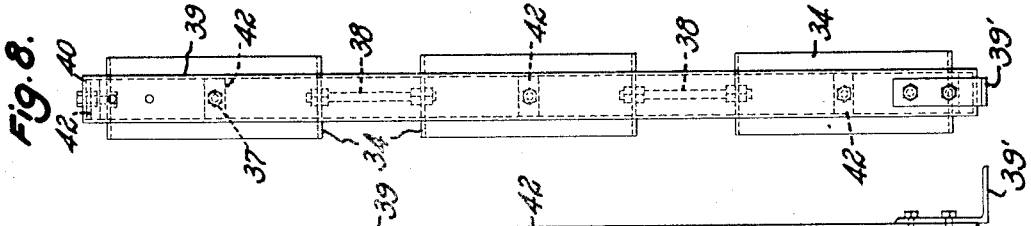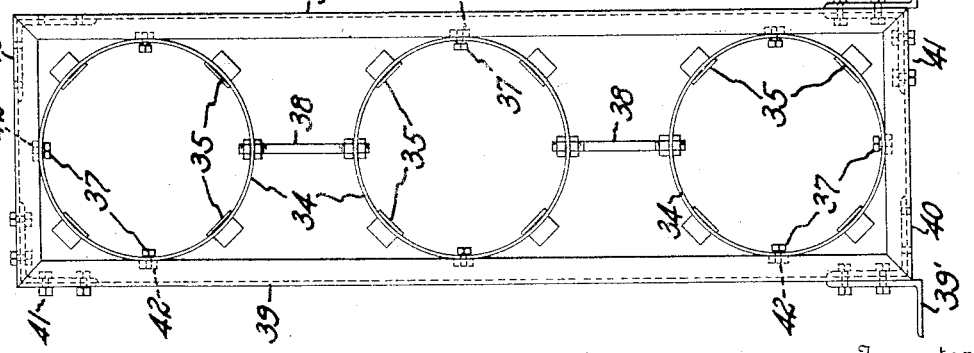

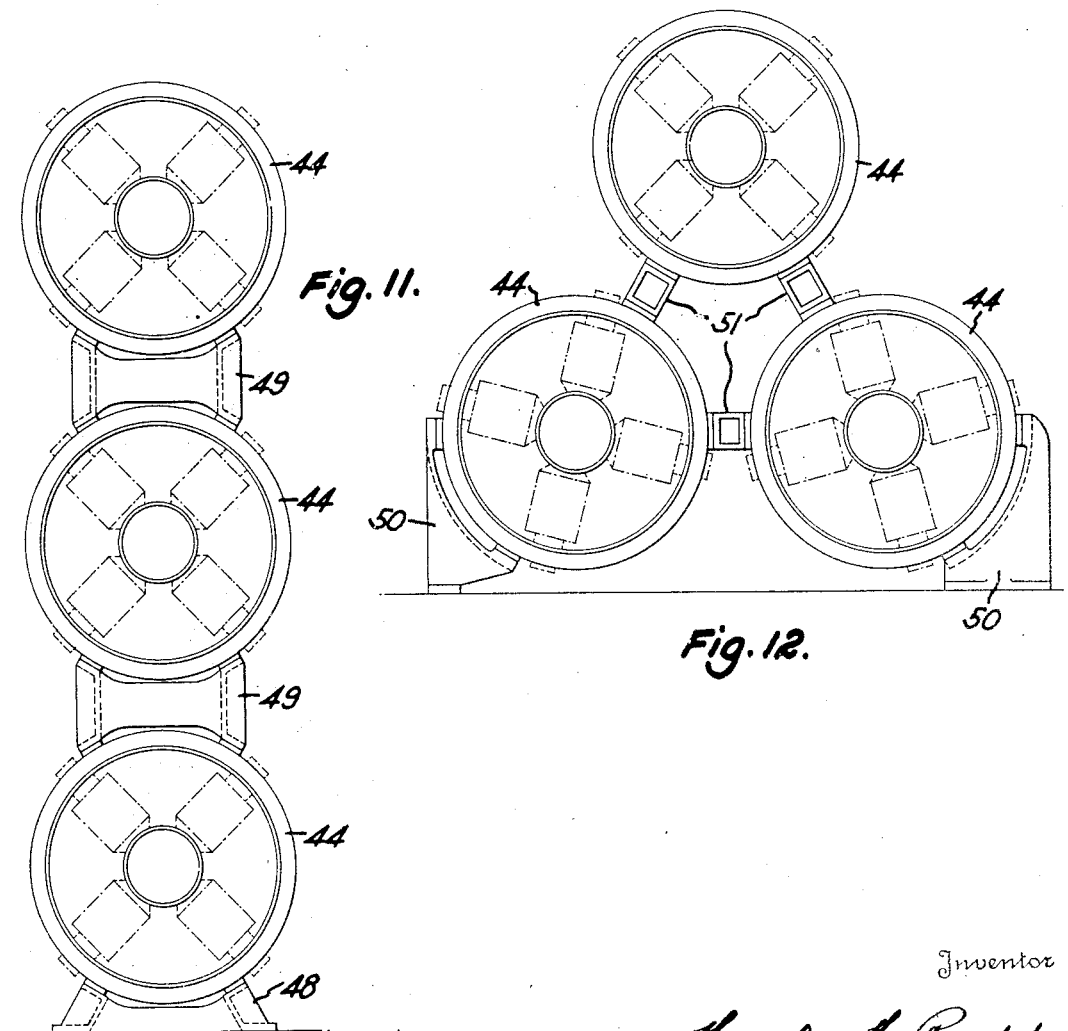

Patented Aug. 18, 1942

2,293,310

UNITED STATES PATENT OFFICE 2,293,310

METAL-ENCLOSED BUS STRUCTURE

Harold H. Rudd, Greensburg, Pa., assignor to Railway and Industrial Engineering Company, Greensburg, Pa., a corporation of Delaware Application November 22, 1940, Serial No. 366,779

20 Claims. (Cl. 174—149)

This invention relates to metal-enclosed bus structures, and particularly to bus structures for use at generating stations and at other points where there are heavy concentrations of electrical energy at relatively high voltages.

This application is a continuation-in-part of my copending applications, Ser. No. 167,639, filed Oct. 6, 1937, "Electrical bus system," and Ser. No. 323,808, filed March 13, 1940, "Disconnect switch," now Patent No. 2,229,006. In the earlier application I have described and broadly claimed a bus system comprising spaced insulator frames secured to a rigid structure and encircling the bus, insulator members within the frames for supporting the bus, and housing plates that are detachably secured to the insulator frames to form a duct enclosing the bus. The later application describes insulator frames in which a plurality of sets of diametrically opposed pillar type insulators are mounted to engage a bushing that is secured to the bus, the insulators of each set being oppositely inclined to a plane normal to the axis of the bus, whereby the bus is anchored against longitudinal movement. The claims of that application are limited to disconnecting switches that include the stated frame and insulator construction.

Objects of the present invention are to provide bus systems including spaced insulator frames that are to be secured to a plane-surfaced support, four pillar insulators mounted within the frame to support the bus, and adjusting devices operable from the exterior of the frame for forcing the insulators towards the bus, the axis of the of the insulators being at 45° to the plane of the support. An object is to provide a multiphase bus system in which each bus is encircled by a plurality of insulator frames carrying insulators for supporting the associated bus, the frames of the several phases being arranged in transversely alined groups and inter-connected for mutual support and/or reinforcement. A further object is to provide an enclosed bus system including spaced insulator frames encircling the bus, pairs of insulators within the frames in planes passing through the axis of the bus, the insulators of each pair being oppositely inclined with respect to a plane normal to the axis of the bus, and bushings on the bus with surfaces engaged by the insulators, the bus being secured to or alternatively slidable within the bushings.

These and other objects and advantages of the invention will be apparent from the following specification when taken with the accompanying drawings in which:

Fig. 1 is a vertical section through a bus system embodying the invention;

Fig. 2 is a front elevation of the same;

Fig. 3 is an enlarged transverse section through one bus and its housing as seen substantially in the plane of line 3—3 of Fig. 2;

Fig. 4 is a similar vertical section through another embodiment, but omitting the housing;

Figs. 5 and 6 are vertical sections through same as viewed on the planes indicated by lines 5—5 and 6—6, respectively;

Figs. 7 and 8 are fragmentary end and side elevations, respectively, of another embodiment of the invention;

Fig. 9 is an enlarged end elevation of the top portion of Fig. 8; and

Figs. 10, 11 and 12 are somewhat schematic views illustrating other geometrical arrangements of the several buses, and different mounting for the insulator frames.

In Figs. 1 and 2 of the drawings, the supporting structure for the bus system is shown as a skeleton framework of steel, comprising vertical members 1 and horizontal members 2, that is anchored in any suitable manner to the walls or floor of the station. The design of the structural framework will vary with the geometry of the bus system but the skeleton framework, when appropriately anchored to the ultimate supporting medium, constitutes the direct support for the bus system. The framework is not relied upon to carry current in the case of a fault to ground as a "ground bus" or heavy copper bar 3 is mounted on the framework to provide a low resistance fault path. Copper bars 3' extend from the ground bus 3 and along the structural members 1 to lie beneath the insulator frames 4 that are bolted to the framework.

Individual insulator frames are provided for each conductor or bus of the power transmission system, and the frames for the several buses are arranged in transversely alined sets or groups. The frames are of non-magnetic material, for example bronze, and each includes a main ring section 4 that is of channel form in cross-section, circular flanges 4' at each side of the main section, and integral legs 5 for securing the frame to the supporting structure. A plurality of pairs of diametrically opposed insulators 6 are adjustably supported in each frame 4, and with the axes of the insulators normal to the axis of the frame to support the conductors or buses 7 substantially centrally of the insulator frames. The insulators are preferably of the "pillar" type with circumferential corrugations to increase the length of the leakage path from the bus to the grounded frames.

The buses 7 may be of any desired design, and are illustrated as hollow tubular conductors of square cross-section. The several insulators 6 are not mechanically connected to the bus but have metal inserts 8 that terminate in surfaces conforming to the contour of the bus. In the case of a square bus and four insulators, the axes of the insulators 6 preferably extend diagonally of the bus, and the ends of the inserts are deeply notched to engage adjacent faces of the bus. The insulators 6 may be forced inwardly towards the bus by pressure screws 9 that bear upon lead or other soft metal plates 10 at the outer concaved ends of the insulators. The ring frames 4 are cast with integral bosses 11 that are threaded to take the pressure screws 9, and the latter are locked in adjusted position by nuts 12.

The set of insulator frames at each structural member 1 may be reinforced by studs that extend between and are bolted to the adjacent frames. The studs are preferably adjustable as to length, and comprise a threaded stem member 13 and a cap member 14.

In the erection of the bus system, a number of the frames 4 are bolted to the supporting structure, a length of bus 7 is threaded into the frames, and the insulators 6 are then placed and adjusted to support the bus. The axes of the insulators 6 are at 45° to the surface engaged by the supporting legs 5, thus spacing the pressure screws 9 away from the support to provide ample room for the adjustment of the screws. The adjacent lengths of the mounted bus are electrically connected in appropriate manner, and the installation may then be completed by mounting non-magnetic plates 15, 16 on the flanges 4' of the insulator frames to form a housing or enclosure for the bus.

The longitudinally mating plates 15, 16 have radial flanges between which gasket strips 17 of leather, rubber or the like are arranged. Adhesive strips 18 of gasket material are applied to the flanges 4' of the frames, and the plates 15, 16 are clamped to each other and upon the flanges 4' by bolts 19. A hermetic sealing of the duct is not essential when the dielectric medium is air, but a free movement of air into and out of the duct with temperature changes is to be avoided.

The described arrangement of the axes of the insulators 6 in the central transverse plane of the frame does not anchor the bus against longitudinal movement with respect to the insulator frame. The construction shown in Figs. 4, 5 and 6 is adapted for more general use throughout the entire run of a bus as it may be adjusted to permit sliding of the bus within the frame or alternatively to prevent longitudinal movement of the bus.

The frame structure is substantially identical with that previously described and includes a main ring section 24 with circumferential flanges 24', mounting brackets 25, and four pressure screws 9 whose axes lie in the central transverse plane of the frame. As viewed in end elevation, the axes of the pressure screws 9 are at 45° to the plane of the mounting surfaces of the brackets 25. The four insulators are not axially alined with the pressure screws but are arranged in pairs 6a, 6b, respectively, whose axes are at opposite sides of the central transverse plane of the frame, and with the axes of the insulators of each pair oppositely inclined to the axis of the frame, thereby to resist forces acting longitudinally of the bus. A metal bushing or collar 26 surrounds the bus with a sliding fit and has domed lugs 27a, 27b at opposite sides of the central transverse plane of the frame for engagement by insulators 6a, 6b, respectively. All of the insulators are of identical design with concave recesses at their opposite ends to fit over the pressure screws and the domed lugs of the sleeve 26. A soft metal cushion layer is provided at the ends of the insulators, either as a separate plate or as die metal 10' cast upon a sand surface that is fired into the insulator.

Set screws 28 extend through the bushing or collar 26 to secure the bus 7 to the collar when the bus is to remain in fixed position with respect to the insulator frame. The set screws are omitted or backed off from the bus at those sections of the bus run where it is preferable to permit a sliding of the bus through the frame in response to temperature changes.

The described constructions are suitable for use with distribution systems carrying loads of the order of several thousand amperes. Adequate strength to resist short circuit stresses is obtained by appropriate design of the main section of the cast metal insulator frame, and heating due to induction in the supporting steel framework is reduced by the supporting legs or brackets that increase the distance between the alternating current bus and the steel frame. Simpler constructions such as shown in Figs. 7 to 9 may be employed at stations where the current load is of a lower order as the structural steel can be placed closer to the bus without undue heating and the frames are subjected to relatively low short circuit stresses.

In the embodiment shown in Figs. 7 to 9, the insulator frames 34 are short cylinders of non-magnetic metal that may be made by rolling plates into ring form and welding the ends, or by cutting sections from a large diameter pipe. Threaded bushings 35 are welded to the ring frame 34 to receive the pressure screws 36, the bushings preferably having radial flanges that seat against the inner surface of the ring frame. Holes are drilled or punched through the ring frame on axes at 45° to the axes of the pressure screws, to receive the studs 37 which mount the rings within a supporting framework and the threaded studs 38 that connect adjacent ring frames to each other.

The framework for each group of frames 34 preferably comprises two complementary L-shaped members formed by welding a side bar 39 and end bar 40 to each other, bolted connections 41 uniting the L-shaped members, and brackets 39' for securing the framework to the floor or wall of the station. The framework is preferably formed of steel channels arranged with their flanges towards the interior of the rectangular frame, and with plates 42 welded across the flanges to receive the studs 37.

The pairs of insulators 43a, 43b are inclined to the radial plane of the axes of the pressure screws to engage domed lugs 44a, 44b, respectively, on the collar 45 which surrounds the bus 46. The set screws 47 of the collar may be turned down to engage the bus when the latter is to be anchored against longitudinal movement.

The relative arrangement of bus bars with respect to each other may be varied in accordance with the available space or other design requirements, and the structural steel supports may be omitted when existing structures at the station afford an adequate support for the insulator frames. As shown in Fig. 10, the annular insulator frames 44 of a three phase bus system may be mounted in horizontal alinement on a supporting medium by bracket legs 45. The insulators 46 for supporting the tubular buses 47 are arranged with their axes at 45° to the supporting surface. A vertically arranged self-supporting structure, as shown in Fig. 11, may include a lower insulator frame 44 that is mounted on a rigid support by a bracket 48, and spacer members 49 that are bolted to the adjacent frames to form a rigid assembly. Another geometrical arrangement of the insulator frames, as shown in Fig. 12, comprises a pair of frames 44 secured to a support by brackets 50, and struts 51 between those frames and the upper frame.

The bus systems of Figs. 4 to 12, inclusive, will be enclosed by longitudinally mating plates, such as the plates 15, 16 of Figs. 2 and 3, but the housing has been omitted from the later views for the better illustration of the distinctive features of those constructions.

The described embodiments of the intention are indicative of the variations that may be made to adapt the invention to the electrical design of the bus system and to meet design limitations as to space and the geometry of the rigid supporting structure. In general, the supporting structure will have a plane surface upon which the insulator frames are to be mounted but the brackets or the legs of the frame may be appropriately shaped to conform to a non-planar mounting surface. It is to be understood that other variations in the design and relative arrangement of the parts fall within the scope of my invention as set forth in the following claims.

I claim:

1. A support for a bus comprising a ring frame for encircling the bus, means for mounting the ring frame upon a support, a plurality of uniformly spaced insulators within said frame, a metallic collar within said frame and adapted to receive the bus with a sliding fit, said collar being engaged by the inner ends of said insulators, and pressure screws threaded into said frame for forcing said insulators towards the axis of the frame to support the bus, said screws being spaced from said mounting means and accessible from the exterior of the frame for adjustment.

2. A support for a bus as claimed in claim 1, wherein certain of said insulators are oppositely inclined with respect to the axis of the frame, in combination with set screws on said collar for engagement with the bus.

3. A support for a bus comprising a frame for encircling the bus, a supporting structure about said frame, means extending through four substantially uniformly spaced points of said frame to secure the same to said supporting structure, four insulators within said frame and symmetrically spaced angularly from said securing means, and pressure screws threaded through said frame to bear against said insulators and force the same towards the bus.

4. A support for a multiple bus system, said support comprising an annular insulator frame encircling each bus, a substantially rigid framework extending about said frames, means extending through opposite sides of each insulator frame to secure the same to said framework, and insulator means within each frame and circumferentially spaced from said securing means for supporting the associated bus.

5. A support for a multiple bus system as claimed in claim 4, wherein said insulator means comprises a plurality of pillar insulators within each frame, and pressure screws adjustable on the respective frames to force said insulators towards the associated bus.

6. A support for a multiple bus system as claimed in claim 4, wherein said insulator means comprises for each frame four uniformly spaced pillar insulators, and pressure screws extending through the frame for forcing said insulators towards the axis of the frame, in combination with a collar engaged by said insulators and adapted to receive the bus with a sliding fit.

7. A support for a multiple bus system as claimed in claim 4, wherein said insulator means comprises for each frame four uniformly spaced pillar insulators, and pressure screws extending through the frame for forcing said insulators towards the axis of the frame, in combination with a collar engaged by said insulators and adapted to receive the bus with a sliding fit, and set screws on said collar for locking engagement with the bus.

8. In an electrical bus system, a plurality of substantially parallel buses, sets of insulator frames spaced along said buses with the frames of each set alined transversely of the buses, each set of frames including a frame individual to each bus and encircling the same, means for securing the frames to a rigid support, struts secured to and mechanically connecting the frames of each set to each other, and insulator means within each frame for supporting the associated bus therein.

9. In an electrical bus system, the invention as claimed in claim 8, wherein said rigid support has a plane surface for engagement by said securing means, and said insulator means comprises four pillar insulators within each frame and uniformly spaced about the associated bus, the axes of the insulators being at 45° to the plane surface of said support.

10. A support for a three phase bus system comprising a rectangular structural framework and means for mounting the same on a supporting medium, three insulator frames within said framework and contacting the same at two circumferentially spaced points, means securing said insulator frames to said framework at said points of contact, and insulator means within each frame for supporting a bus, each insulator frame including cylindrical sections extending to opposite sides of said framework to receive longitudinally mating duct-forming plates.

11. A support for a three phase bus system as claimed in claim 10, wherein said insulator frames are spaced from each other, and struts between adjacent insulator frames cooperate with said securing means to provide a four-point support for each insulator frame.

12. A support for a plurality of parallel buses comprising a rectangular structural framework surrounding the buses, insulator frames at opposite ends of said framework and spaced from each other, means extending through each frame at the opposite sides thereof and at the portion adjacent the end of the framework to secure the frame to said framework, means additional to said framework mechanically connecting said frames to each other, and insulator means within each frame for supporting a bus.

13. A support for a plurality of parallel buses as claimed in claim 12, wherein each of said insulator frames comprises a short cylinder of non-magnetic material.

14. A support for a plurality of parallel buses as claimed in claim 12, wherein said structural framework comprises complementary L-shaped members that each form a side and one end of the rectangular framework, and bolted connections between said L-shaped sections.

15. A support for a bus comprising an annular frame for encircling the bus, means for securing the frame to a support, at least two pairs of pillar insulators within the frame and uniformly spaced about the axis thereof, the axes of the insulators of each pair being in a plane extending substantially diametrically through the axis of the frame, a bushing within the frame and adapted to receive the bus with a sliding fit, and adjustable means carried by the frame for forcing the several insulators into engagement with the bushing to support the same.

16. A support for a bus as claimed in claim 15, wherein the axes of the insulators of two of said pairs are at opposite sides of a transverse plane through the frame, and the axes of the insulators of each of said two pairs are oppositely inclined with respect to the axis of the frame.

17. A support for a bus as claimed in claim 15, wherein the axes of the insulators of two of said pairs are at opposite sides of a transverse plane through the frame, and the axes of the insulators of each of said two pairs are oppositely inclined with respect to the axis of the frame, in combination with means for securing said bushing to a bus extending through the same.

18. In a bus support, a bushing having a bore adapted to receive a bus with a sliding fit, means on the exterior surface of said bushing forming seats for a plurality of insulators, and a threaded opening through said bushing to receive a set screw for clamping the bushing to a bus.

19. In a bus support, a bushing having a bore adapted to receive a bus with a sliding fit, set screws threaded through said bushing for engagement with a bus, and bosses on the exterior of said bushing forming seats for insulators.

20. In a bus support, the invention as claimed in claim 19, wherein said bosses are in pairs alined in planes passing through the axis of the bushing.

HAROLD H. RUDD.